United States Patent
Watanabe (10) Patent No.: US 9,517,563 B2
(45) Date of Patent: Dec. 13, 2016

(54) ROBOT SYSTEM USING VISUAL FEEDBACK

(71) Applicant: FANUC Corporation, Yamanashi (JP)

(72) Inventor: Keisuke Watanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 33 days.

(21) Appl. No.: 14/618,326

(22) Filed: Feb. 10, 2015

(65) Prior Publication Data
US 2015/0224649 A1    Aug. 13, 2015

(30) Foreign Application Priority Data
Feb. 13, 2014  (JP) ................................ 2014-025600

(51) Int. Cl.
  B25J 9/16     (2006.01)
  G05B 19/408   (2006.01)
(52) U.S. Cl.
  CPC ............ *B25J 9/1697* (2013.01); *B25J 9/1607* (2013.01); *B25J 9/1692* (2013.01); *G05B 19/4083* (2013.01); *G05B 2219/39397* (2013.01); *G05B 2219/40003* (2013.01); *Y10S 901/09* (2013.01)
(58) Field of Classification Search
  CPC ............... G05D 1/0246; G06T 1/0014; G05B 19/401–19/4015; G05B 19/4083; G05B 2219/40003; G05B 2219/39397; G05B 2219/39011; G05B 2219/39024; G05B 2219/39045; B25J 9/1607; B25J 9/1692; B25J 9/1694–9/1697; B25J 19/02; B25J 19/021; B25J 19/023; B25J 9/1653; Y10S 901/03; Y10S 901/46; Y10S 901/47

USPC ............ 700/258, 259, 254; 901/9, 3, 46, 47; 318/568.13, 568.16
See application file for complete search history.

(56) References Cited

U.S. PATENT DOCUMENTS

| | | | |
|---|---|---|---|
| 6,256,560 B1 * | 7/2001 | Kim | G05D 1/0246 180/168 |
| 7,904,207 B2 * | 3/2011 | Nagatsuka | B25J 9/1674 318/568.1 |
| 2005/0102060 A1 | 5/2005 | Watanabe et al. | |
| 2005/0107920 A1 * | 5/2005 | Ban | B25J 9/1692 700/245 |

(Continued)

FOREIGN PATENT DOCUMENTS

| | | |
|---|---|---|
| CN | 1834835 A | 9/2006 |
| CN | 102161126 A | 8/2011 |

(Continued)

*Primary Examiner* — Bao Long T Nguyen
(74) *Attorney, Agent, or Firm* — Hauptman Ham, LLP (57) ABSTRACT

The robot system includes: a robot for performing predetermined operations on an object placed at a first object position; a first robot position storage configured to store the position of an arm end arranged in a predetermined positional relationship relative to the first object position; a target arrival state data storage configured to store feature quantities of the object on the camera image; a robot movement amount calculator configured to calculate the amount of movement in order to make the feature quantities of the object placed at a second object position coincide with the feature quantities of the target arrival state data; and a correction data calculator configured to calculate correction data based on the difference between the second robot position when the arm end has been moved based on the amount of movement and the first robot position.

6 Claims, 7 Drawing Sheets

(56) References Cited

U.S. PATENT DOCUMENTS

| | | | |
|---|---|---|---|
| 2006/0063599 A1* | 3/2006 | Greenspan | B25J 9/1697 473/1 |
| 2006/0181236 A1* | 8/2006 | Brogardh | B25J 9/1671 318/568.1 |
| 2007/0293987 A1* | 12/2007 | Yamada | B25J 13/06 700/245 |
| 2009/0187276 A1* | 7/2009 | Nagatsuka | B25J 9/1697 700/245 |
| 2014/0288710 A1* | 9/2014 | Ikenaga | B25J 9/1697 700/259 |

FOREIGN PATENT DOCUMENTS

| | | |
|---|---|---|
| DE | 602004013107 T2 | 7/2009 |
| JP | 5-241626 A | 9/1993 |
| JP | 10-49218 A | 2/1998 |
| JP | 2003-211381 A | 7/2003 |
| JP | 2005-138223 A | 6/2005 |
| JP | 2008-132525 A | 6/2008 |
| JP | 4265088 B | 5/2009 |
| JP | 2010-076054 A | 4/2010 |
| JP | 2011-93076 A | 5/2011 |
| JP | 2013-63474 A | 4/2013 |
| WO | 92/15838 A | 9/1992 |

* cited by examiner

ROBOT SYSTEM USING VISUAL FEEDBACK

CROSS-REFERENCE TO RELATED APPLICATIONS

This application is a new U.S. patent application that claims benefit of JP 2014-025600, filed on Feb. 13, 2014, the entire content of JP 2014-025600 is hereby incorporated by reference.

FIELD OF THE INVENTION

The present invention relates to a robot system that corrects the operation of a robot using a camera, in particular relating to a robot system using visual feedback in order to eliminate the necessity of having performed registration (position adjustment) between the robot coordinate system and the camera coordinate system.

BACKGROUND OF THE INVENTION

Many industrial robots are operated based on a scheme called teaching playback. That is, the movement and operations the user wants the robot to perform have been taught in advance as a program so as to make the robot perform desired operations by playing back the program. The robot is able to repeat programmed movement and operations exactly. However, once the object is placed at a position different from that taught by the program, the robot cannot perform correct operations on the object.

To deal with this, there is a known technology in which the position of the object is recognized by use of a vision sensor such as a camera, etc., so that the operation of the robot is corrected based on the positional information on the object recognized by the vision sensor. This method makes it possible to perform exact operations on the object even if the object is placed at a position different from that taught by the program.

The position of the object identified by the vision sensor is represented in a coordinate system. (which will be referred to hereinbelow as "the vision coordinate system") based on which measurement of the vision sensor is performed. In order to correct the operation of the robot based on the positional information identified by the vision sensor, the positional information represented in the vision coordinate system needs to be transformed into the positional information in the coordinate system (which will be referred to hereinbelow as "the robot coordinate system") based on which the operation of the robot is controlled. The data for converting the positional information represented in the vision coordinate system into the positional information represented in the robot coordinate system is referred to as "camera calibration data", and the job for acquiring the camera calibration data is referred to as "camera calibration" (e.g., Japanese Unexamined Patent Publication No. JP-A-10-49218).

On the other hand, there is a known technique called visual feedback as a method that enables correction of the position of the robot using a vision sensor without performing camera calibration (e.g., Japanese Unexamined Patent Publication No. JP-A-2003-211381, which will be referred to hereinbelow as "Patent Document 2"). For example, the robot is moved to a position for gripping the object and is made to take an image of the object by the camera attached to the robot and store the appearance of the object as target data. In the actual operation, an image of the object is taken by the camera every time the robot is moved, then the position and attitude of the robot is controlled so that the appearance of the object coincides with the target data. This process is iterated. When the error has converged to zero, gripping with the hand is implemented.

In the method described in Patent Document 2, the robot grips the object by a hand at a position where the error has become zero. This means that the appearance of the object on the camera when the robot is positioned at a place where the object is gripped, needs to be stored as the target data. This requirement limits the positional relationship between the camera and the hand attached at the arm end of the robot, hence restricts free design.

Since this method enables the robot to perform operations on the object only at the position Where the error is zero, the operation is free from problems when the robot is made to perform a simple task such as gripping the object. However, this method cannot be used when it is necessary to make the robot perform a job that needs complicated motion paths such as to apply an adhesive to the object through a predetermined path, for instance.

There is another proposed method in which the difference between the position of the robot when target data was configured relative to a reference object and the position of the robot when the robot performs a gripping operation of the reference object, has been stored as a position transformation matrix, and the robot is operated to converge the error to zero, then is moved following the stored position transformation matrix to perform a gripping operation (e.g., Japanese Patent Publication No. JP-B-4265088). In this invention, in comparison with the method disclosed in Patent Document 2, restriction on the positional relationship between the camera and the hand attached to the arm end of the robot is eliminated. However, this method offers no solution to the problem that the method cannot be used when the robot is required to perform a job that needs complicated motion paths.

Incidentally, when the object is placed on a flat pedestal such as a table or the like, in order to control the position and attitude of the robot so that the appearance of the object coincides with the target data, it is preferable that the robot is controlled to keep the distance from the camera attached to the arm end of the robot to the table on which the object is placed, unvaried. Further, when the orientation of the object changes, it is necessary to control the robot so that the relative direction of the object to the camera is unchanged. For this purpose, it is preferable that the camera is controlled so as to rotate on an axis that is perpendicular to the table surface so that the inclination of the camera relative to the table will not change.

However, in the general visual feedback, it is neither guaranteed that the distance between the camera and the table is unchanged nor that the relative inclination between the camera and the table is unchanged. As a result, there are cases in which controlling the robot so that the appearance of the object coincides with the target data takes a longer time than needed.

In order to avoid this problem, a coordinate system that is parallel to the table surface may and should be configured in the robot so that the camera can be moved based on this coordinate system. For example, it is possible to configure a robot coordinate system on the table surface by defining an arbitrary point on the hand of the robot as the TCP (Tool Center Point), making the TCP of the robot touch three points on the table surface but not in a line to read the coordinate values of the TCP at each point, viewed from the robot coordinate system (e.g., Japanese Unexamined Patent Publication No. JP-A-2010-076054).

However, the operation for setting up the coordinate system using this method entails the problem that the operator's skill makes a difference in setting precision and the risk that the hand and the table may be damaged by erroneous operations since the hand of the robot is brought into physical contact with the table.

The present invention is to provide a system for correcting the operation of a robot using visual feedback, which enables operations on an object involving complicated paths and enables the camera to move parallel to the table surface and rotate about an axis normal to the table surface without an operator's cognition of the robot coordinate system, to thereby efficiently move the camera to a predetermined position.

SUMMARY OF THE INVENTION

A robot system according to one embodiment of the present invention includes: a robot that is controlled by a program including operational instructions for performing predetermined operations on an object placed at a first object position on a plane by use of a device attached to an arm end of the robot; a camera that is attached to the arm end to take the image of the object; a first robot position storing unit that stores, as a first robot position, the position of the arm end arranged in a predetermined positional relationship relative to the first object position; a target arrival state data storing unit that stores, at least, one feature quantity among the position, attitude and size of the object on the image of the camera in a target arrival state where the object is placed at the first object position while the arm end is positioned at the first robot position, as the target arrival state data; a robot movement amount calculator that calculates the amount of movement from an arbitrary initial position of the arm end in order to make, at least, one feature quantity of the position, attitude and size on the camera image of the object when the object placed at a second object position on the plane has been captured by the camera with the arm end of the robot positioned at the arbitrary initial position, agree with the corresponding feature quantity of the target arrival state data; and, a correction data calculator that calculates the correction data for correcting the program based on the difference between the second robot position, or the position of the arm end when the arm end has been moved based on the calculated amount of movement, and the first robot position.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

The robot system according to the present invention will be described with reference to the drawings. It should be noted that the technical scope of the present invention is not limited to the embodiments hereof but includes the invention defined in the scope of the Claims and its equivalent.

Figure 1:
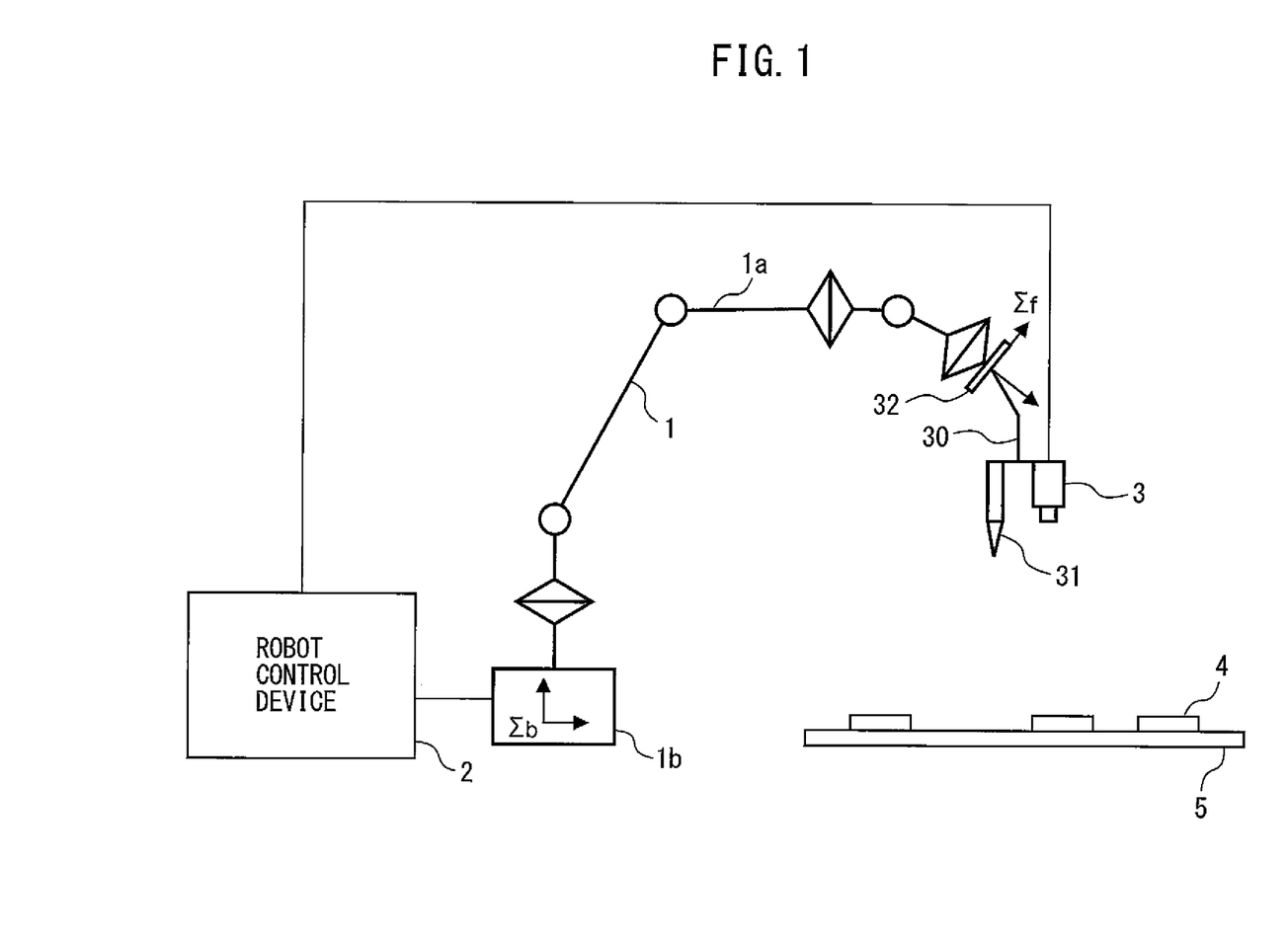
FIG. 1 is a diagram showing the overall configuration of a robot system in the first embodiment of the present invention.

FIG. 1 is a diagram showing the overall configuration of the robot system in the embodiment of the present invention. The robot system according to the embodiment of the present invention includes: a robot 1 that is controlled by a program including operational instructions for performing predetermined operations on an object 4 placed at a first object position on a plane 5 by use of a tool 30 as a device attached to a mechanical interface unit 32 provided in the arm end of the robot 1; a camera 3 that is attached to the mechanical interface unit 32 to take the image of the object 4; a first robot position storing unit (which will be also called hereinbelow simply "robot position storage") 12a (FIG. 2) for storing the position of the mechanical interface unit 32 that is arranged in a predetermined positional relationship relative to the first object position, as the first robot position; a target arrival state data storage 12b that stores at least one feature quantity among the position, attitude and size of the object 4 on the image of the camera 3 in a target arrival state where the object 4 is placed at the first object position while the mechanical interface unit 32 is positioned at the first robot position, as the target arrival state data; a robot movement amount calculator 11b that calculates the amount of movement from an arbitrary initial position of the mechanical interface unit 32 in order to make, at least, one feature quantity of the position, attitude and size on the camera image of the object when the object placed at a second object position on the plane has been captured by the camera with the arm end of the robot positioned at the arbitrary initial position, coincide with the corresponding feature quantity of the target arrival state data; and a correction data calculator 11c that calculates the correction data for correcting the program based on the difference between the second robot position, or the position of the mechanical interface unit 32 when the mechanical interface unit 32 has been moved based on the amount of movement, and the first robot position.

The robot 1 is a well-known typical robot, for example, a 6-axis multi-joint robot. The robot 1 includes an arm unit 1a and a base unit 1b, and is connected to a robot control device 2 for controlling the robot 1.

The mechanical interface unit 32 arranged at the arm end of the arm unit 1a is equipped with a tool 30. The tool 30 depicted in FIG. 1 is a mechanism for performing operations on an object, such as a nozzle 31 for adhesive application, for example. The mechanical interface unit 32 is further equipped with a camera 3 for taking the image of the object 4.

On the robot 1, a robot coordinate system Σb fixed to the base unit 1b and a mechanical interface coordinate system of fixed to the mechanical interface unit 32 are defined. The robot control device 2 controls the position and attitude R of the mechanical interface coordinate system Σf, viewed from the robot coordinate system Σb, as the current position of the robot. Herein, R is a 4×4 homogeneous transformation matrix. Hereinbelow, unless otherwise indicated, the "robot position" is the position and attitude R of the mechanical interface coordinate system Σf viewed from the robot coordinate system Σb.

The camera 3 is, for example a CCD camera for industrial use, and a well-known light-receiving device having an image capturing function. In the present embodiment, the robot control device 2 is presented to have an image processing function, and the camera 3 is connected to the robot control device 2. However, the invention should not be limited to this example, but can be realized by providing a device for image processing such as a PC or the like, connecting the camera 3 to the image processing device, and connecting the image processing device and the robot control device 2 with a communication cable.

The object 4 is placed on a flat table 5. The robot 1 can be moved to fit the object 4 into the visual field of the camera 3, to thereby take the image of the object 4 by the camera 3.

Figure 2:
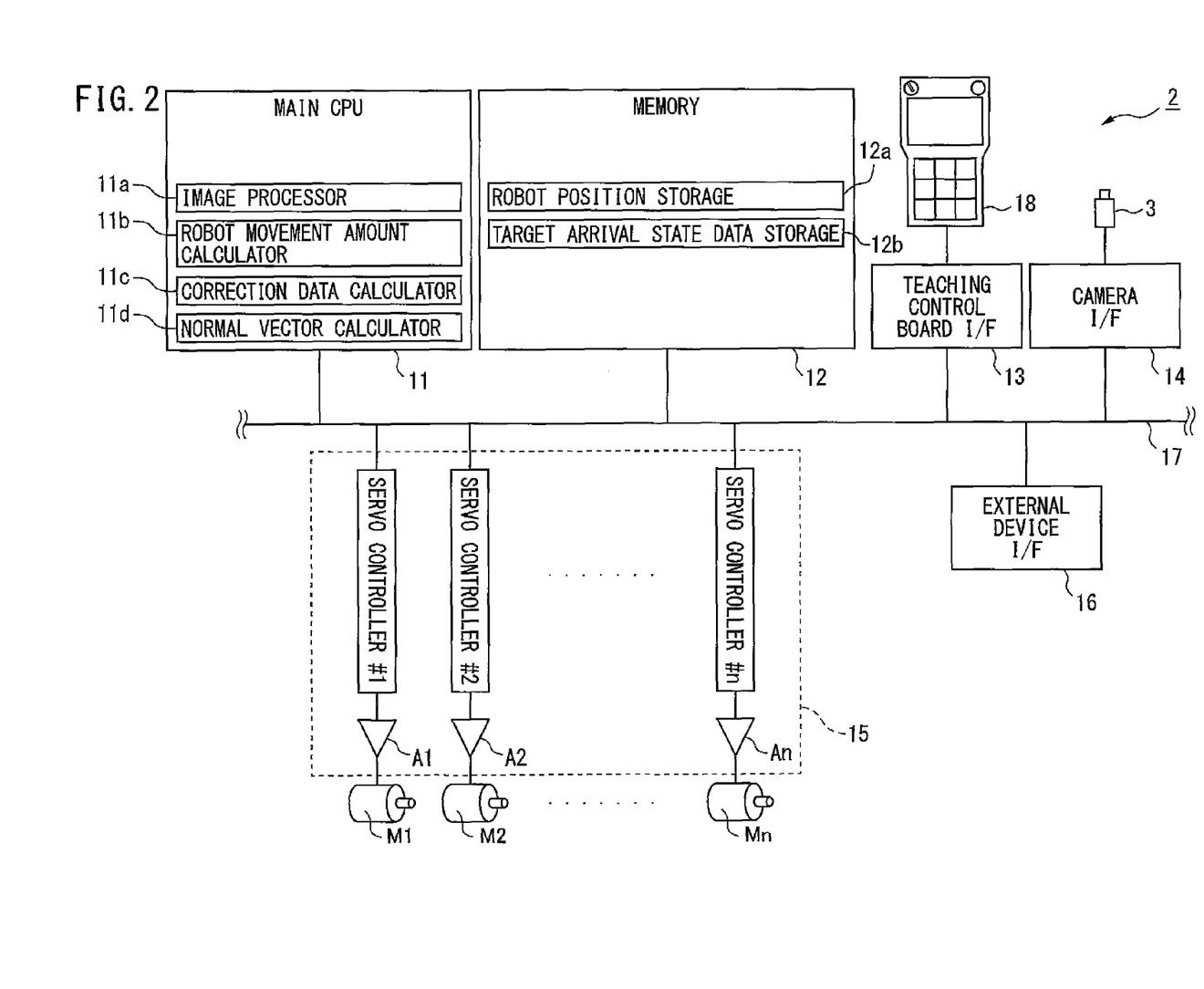
FIG. 2 is a block diagram showing a robot control apparatus used in the present invention.

FIG. 2 is a block diagram depicting a robot control device used in the present invention. The robot control device 2 includes a main CPU (hereinbelow referred to simply as "CPU") 11.

The CPU 11 includes: an image processor 11e for calculating the feature quantities such as the position, attitude, size and the like of the object 4 appearing in the image captured by the camera 3; a robot movement amount calculator 11b for determining the amount of movement of the robot based on the calculated feature quantities and the stored target arrival state data; a correction data calculator 11c for calculating the correction data for correcting the operation of the robot based on the first robot position and the second robot position; and a normal vector calculator 11d for determining the normal vector to the surface of the table 5 on which the object 4 is placed, based on multiple second robot positions.

Connected to a bus 17 extended from the CPU 11 are a memory 12 including RAM, ROM, nonvolatile memories, etc., a teaching control board interface 13, a camera interface 14, a servo control unit 15, and an external device I/O interface 16.

A teaching control board 18 is to the teaching control board interface 13. An operator can, by operating the teaching control board 18, prepare, modify, register the robot program and set up various parameters of the program, and in addition, play back the taught robot program, perform manual control on the robot position and others. Further, in the present embodiment, the robot control device 2 has an image processing function, so that the operator can, by operating the teaching control board 18, prepare, modify, register the image processing program and set up various parameters of the program, and in addition, play back the taught image processing program, perform detection test and others.

The system software for controlling the robot 1 and the system software for performing image processing are stored in the ROM of the memory 12. The robot program to which the content of the task of the robot is taught in accordance with the application and the associated data of settings are stored in nonvolatile memory of the memory 12. The RAM of the memory 12 is used for the storage area for temporarily storing the data in various arithmetic processing performed by the CPU 11. The memory 12 includes the robot position storage 12a for storing the robot position and the target arrival state data storage 12b for storing the target arrival state data calculated by the image processor 11b.

The servo control unit 15 includes servo controllers #1 to #n (n is the total number of axes of the robot, n=6 is assumed herein), and receives operational commands from the CPU 11 and outputs a torque command to each of servo amplifiers A1 to An together with the feedback signal received from the pulse coder (not depicted) attached to each axis. Each servo amplifier A1 to An supplies electric current to servo motor M1 to Mn for each axis to drive the motors, based on the corresponding torque command.

Connected to the camera interface 14 is the imaging device, i.e., a camera 3. As an image capturing command is sent from the CPU 11 via the camera interface 14, the camera 3 performs image capturing by the electronic shutter function, so that the image signal is stored in the form of gray-scale signals into the memory 12 via camera interface 14.

In the robot system of the present application, the robot program for performing predetermined operations on the object 4 has been taught with the object 4 placed at one arbitrary position on the table 5. This position is referred to as "the reference position". When the object 4 is set at the reference position, it is possible for the robot 1 to perform pertinent operations on the object 4 by merely running the robot program.

Under such circumstances, when the object 4 is placed at a position different from the reference position, correction data is calculated by the aftermentioned method disclosed by the present invention so that the robot program is run while being corrected based on the correction data, to thereby enable the robot 1 to perform appropriate operations on the object 4 that is placed at a position other than the reference position.

Figure 3:
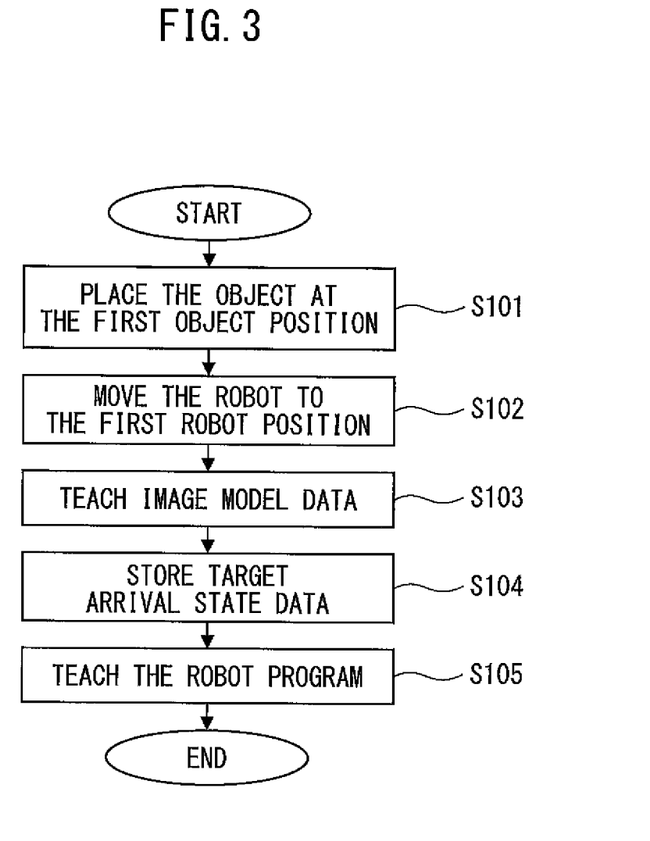
FIG. 3 is a flow chart for illustrating the flow when the robot system of the present invention is booted.

FIG. 3 is a flow chart for illustrating the flow when the robot system of the present invention is set up. Hereinbelow, the setup procedures of the robot system will be described with reference to FIG. 3.

To begin with, an object 4 is set at the reference position on the table 5 (which will be referred to hereinbelow as "the first object position") (S101).

Next, the robot 1 is moved to the first robot position so that the object 4 placed at the first object position appears in the visual field of the camera 3 (S102). The first robot position is preferably set such that the optical axis of the camera 3 becomes approximately perpendicular to the plane of the table 5, but is not limited to this requirement. For example, there is no problem if the optical axis of the camera 3 is slightly inclined with respect to the plane of the table 5. Further, in order to minimize the influence on the captured image of the object 4 from lens distortions and others, the first robot position is preferably set so that the object 4 will appear approximately in the center of the visual field of the camera.

Next, the image of the object 4 is taken by the camera 3, and the image of the object 4 is taught as the model data (S103). Herein, what kind of information should be stored as the model data depends on the algorithm of image processing used to detect the object 4 from the image. In the present invention, any image processing algorithm may be used. For example, template matching using normalized correlation, the generalized Hough transform using edge information and other techniques have been known and may be used.

When template matching based on normalized correlation is used, the template corresponds to the model data.

Next, the taught model data is used to detect the object 4 from the image. The feature quantities such as the position, attitude, size and the like on the image of the detected object 4 are stored as the target arrival state into the target arrival state data storage 12b while the first robot position is stored into the robot position storage 12a (S104). For example, when template matching is adopted as the image processing algorithm, the center position, rotational angle, the enlargement/reduction ratio of the template that shows the highest degree of match can be sampled as the feature quantities for the position, attitude and size.

Finally, the robot program that will cause the robot 1 to perform predetermined operations on the object 4 placed at the first object position, is taught (S105).

Figure 4:
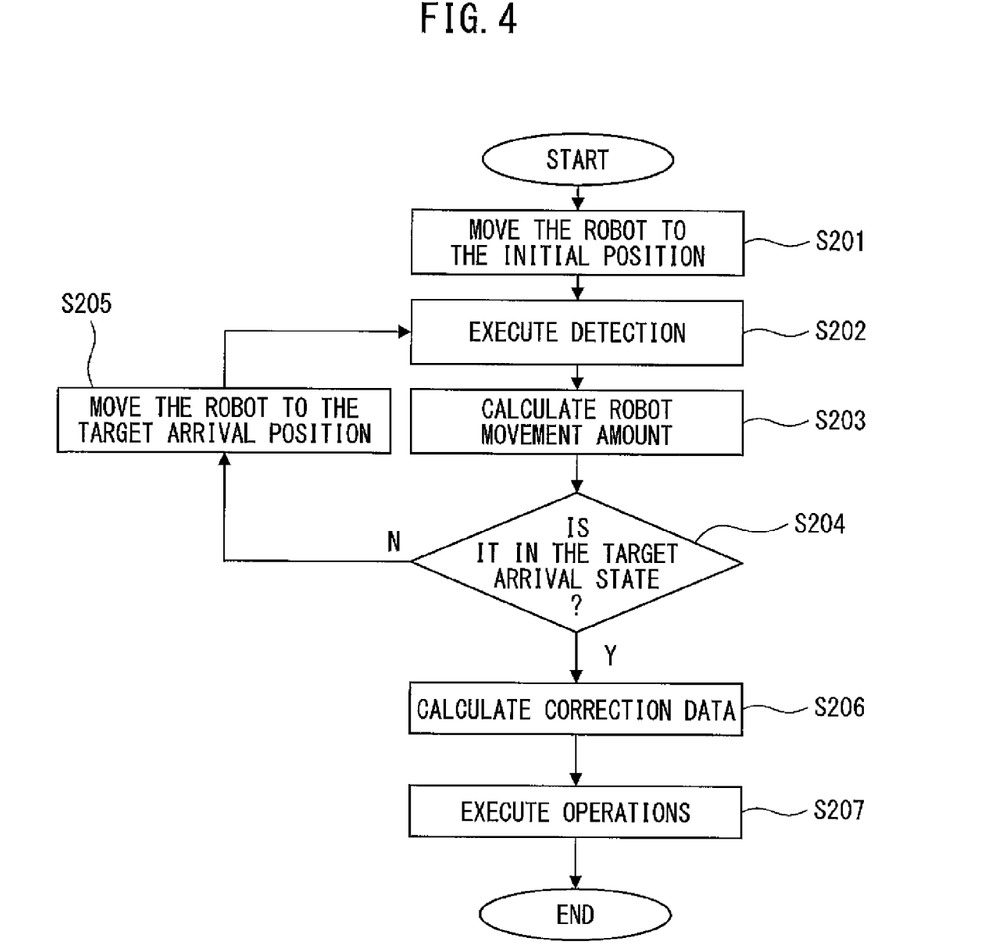
FIG. 4 is a flow chart for illustrating the process when a job is executed in the robot system of the present invention.

FIG. 4 is a flow chart for illustrating the process when the robot system of the present invention executes operations. The robot system operation of the robot system of the present invention will be described with reference to FIG. 4.

First, the robot is moved to the initial position (S201). Usually, the initial position of the robot may be set at the first robot position. However, as long as the object 4 appears in the visual field of the camera 3 while the robot can take the same attitude as that of the first robot position, the robot may be set at a different initial position. For example, when the table 5 is wide so that the whole area of the table 5 cannot fit in the visual field of the camera 3, it is possible to perform measurements by dividing the whole area of table 5 into multiple visual fields by changing the initial positions.

Next, the image of the object 4 is taken by the camera 3 so as to perform detection of the object 4 by image processing (S202). The image processing algorithm may use the same technique as that of S104 above, so that information on the feature quantities (the position, attitude, size on the image) is acquired.

Next, the amount of robot movement to move the robot to such a position that the feature quantities acquired at S202 agree with the stored target arrival state data is calculated (S203). There have been various techniques for calculating the amount of robot movement based on the feature quantities sampled from the image. In the present invention, the technique to be used is not limited, but one example will be described later.

Next, it is determined whether the current robot position is in the target arrival state (S204). This determination may be made by comparing the magnitude of the amount of robot movement calculated at S203 with the previously set threshold. For example, with a threshold of 0.5 mm, if the calculated amount of robot movement is less than 0.5 mm it is possible to determine that the robot is in the target arrival state. The evaluation criterion at S204 may use a value that has been obtained by comparing the difference between one of the feature quantities acquired at S202 and the corresponding feature quantity of the stored target arrival state data, with the previously set threshold. For example, when the threshold is one pixel, it is possible to determine that the robot position is in the target arrival state if the difference of the calculated position is less than one pixel.

When not in the target arrival state, the robot 1 is moved based on the amount of robot movement calculated at S203 (S205). Though it is possible to directly go to the next step (S206) by assuming that a single move of the robot is enough to reach the target arrival state, in the flow chart in FIG. 4 the control is adapted to return to S202 in order to reconfirm that the robot position satisfies the target arrival condition at S204.

When the robot is determined to be in the target arrival state, the current robot position is registered as the second robot position, and at the same time the correction data for performing operations on the detected object 4 is calculated based on the stored first robot position and the second robot position.

The principle of correction to the robot program and the calculation method of correction data are described as follows.

As described above, the robot position can be represented as the position and attitude R of the mechanical interface coordinate system $\Sigma f$ viewed from the robot coordinate system $\Sigma b$. Herein R is a 4×4 homogeneous transformation matrix. Since the robot program moves the robot 1 to multiple robot positions successively, it is possible to regard the program as a set of a plurality of robot positions. When the i-th robot position is denoted as $R_i$, the correction data to be determined can be considered as a 4×4 homogeneous transformation matrix X that satisfies the following equation:—

$$R_i' = X \cdot R_i$$

Figure 6:
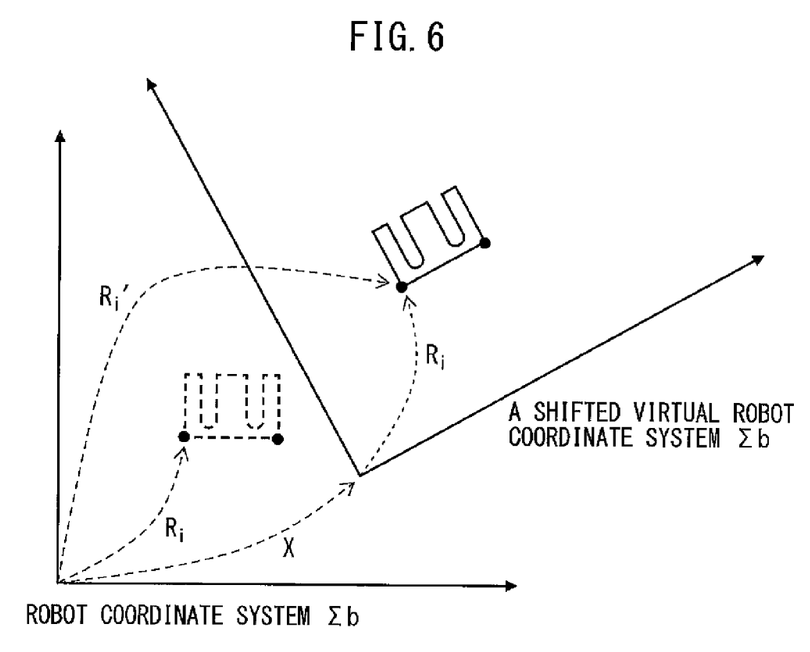
FIG. 6 is a diagram showing a shifted virtual robot coordinate system.

In other words, correction to the robot can be carried out by running the program whilst transforming the robot position $R_i$ taught in the robot program into $R_i'$ by use of the above equation based on the correction data X. Since this transformation matrix. X has the effect of running the robot program by virtually shifting the robot coordinate system $\Sigma b$ by X, it is possible to correct the robot program appropriately so as to be suited to the position and orientation of the object 4 even if the job entails complicated paths.

In the present invention, when the stored first robot position is represented by $R_1$ and the second robot position by $R_2$, correction data X can be calculated based on $R_1$ and $R_2$ by the following equation:

$$X = R_2 \cdot R_1^{-1}$$

Finally, the taught robot program is run while being corrected based on the calculated correction data (S207).

Subsequently, as an example of the calculation method at S203 for calculating the robot movement to coincide the robot position with the target arrival state based on the feature quantities acquired from the image, a method using Jacobian matrixes will be described.

Figure 5:
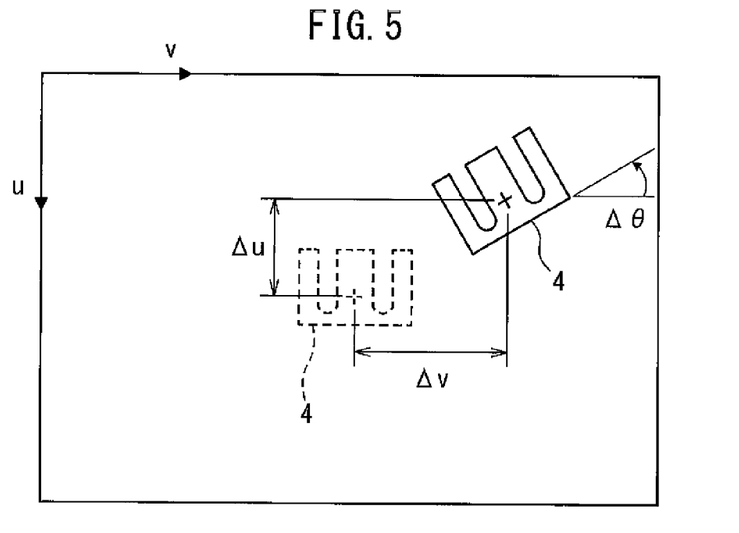
FIG. 5 is a plan view showing an object placed at the first and second positions.

First, the amount of robot movement to conform with the target arrival state is calculated based on the difference between the detected feature quantities of the object and the feature quantities stored as the target arrival state data. FIG. 5 is a plan view depicting the object placed at the first and second object positions. For example, in FIG. 5, the image of the object 4 residing at the first object position is represented by the broken line and the object 4 residing at the second object position is represented by the solid line. When the position in the vision coordinate system is denoted by (u, v), $\Delta u$ is the difference in vertical position of the image and $\Delta v$ is the difference in horizontal position of the image.

The feature quantity of the apparent size on the image is denoted by s. For example, in the case of template matching, it is possible to represent this feature quantity with a value greater than 1.0 if the object appears larger than the template and with a value smaller than 1.0 if the object appears smaller than the template, where the size of the template is 100%=1.0.

When the feature quantities stored as the target arrival data are assumed as $(u_0, v_0, s_0)$ and the feature quantities obtained at step S202 are assumed as $(u_1, v_1, s_1)$, the differences of the feature quantities can be given by the following equations:—

$$\Delta u = u_1 - u_0$$
$$\Delta v = v_1 - v_0$$
$$\Delta s = \frac{1}{s_1} - \frac{1}{s_0}$$

Since the feature quantity s of the apparent size on the image is inversely proportional to the distance to the camera 3 from the table surface 5 on which the object is placed, the reciprocal, instead of the ratio itself, which is a value that is proportional to the distance, is used.

When the amount of robot movement to be determined is denoted by $(\Delta x, \Delta y, \Delta z)$, a Jacobian matrix J can be defined by the following equation:—

$$\begin{bmatrix} \Delta x \\ \Delta y \\ \Delta z \end{bmatrix} = J \begin{bmatrix} \Delta u \\ \Delta v \\ \Delta s \end{bmatrix} \quad (1)$$

The amount of robot movement $(\Delta x, \Delta y, \Delta z)$ may be represented in any coordinate system. However, when taking into account that the relative positional relationship between the camera 3 and the mechanical interface coordinate system Σf is fixed, the amount of robot movement is preferably represented in the mechanical interface coordinate system Σf. That is, in the present embodiment, $(\Delta x, \Delta y, \Delta z)$ are defined as the amounts by which the robot 1 should be moved in the directions of the X-axis, Y-axis and Z-axis of the mechanical interface coordinate system Σf.

Next, the method of determining the Jacobian matrix J will be described.

First, suppose that the robot is placed at the original position where the object 4 appears approximately in the center of the image. When the robot 1 is positioned at the original position, the object 4 is detected from the image captured by the camera 3 so as to acquire feature quantities as $(u_0, v_0, s_0)$. Then, the robot 1 is moved from the original position by a distance m in the X-axis direction of the mechanical interface coordinate system Σf, so as to detect the object 4 from the image captured by the camera 3 at the position and obtain the feature quantities as $(u_X, v_X, s_X)$. Similarly, at the positions to which the robot is moved from the original position by a distance m in the Y-axis direction and by a distance m in the Z-axis direction of the mechanical in coordinate system Σf, the object 4 is detected so as to obtain the feature quantities as $(u_Y, v_Y, s_Y)$ and $(u_Z, v_Z, s_Z)$, respectively.

From the detection results of the object when the robot has been moved in the directions of the X, Y and Z axes and the detection result of the object at the original position, $\Delta u$, $\Delta v$ and $\Delta s$ are determined as follows:—

$$\Delta u_x = u_x - u_0$$
$$\Delta v_x = v_x - v_0$$
$$\Delta s_x = \frac{1}{s_x} - \frac{1}{s_0}$$

-continued $$\Delta u_y = u_y - u_0$$
$$\Delta v_y = v_y - v_0$$
$$\Delta s_y = \frac{1}{s_y} - \frac{1}{s_0}$$

$$\Delta u_z = u_z - u_0$$
$$\Delta v_z = v_z - v_0$$
$$\Delta s_z = \frac{1}{s_z} - \frac{1}{s_0}$$

By substituting these into Eq. (1), the Jacobian matrix J can be obtained as follows:—

$$\begin{bmatrix} m & 0 & 0 \\ 0 & m & 0 \\ 0 & 0 & m \end{bmatrix} = J \begin{bmatrix} \Delta u_x & \Delta u_y & \Delta u_z \\ \Delta v_x & \Delta v_y & \Delta v_z \\ \Delta s_x & \Delta s_y & \Delta s_z \end{bmatrix}$$

$$J = \begin{bmatrix} m & 0 & 0 \\ 0 & m & 0 \\ 0 & 0 & m \end{bmatrix} \begin{bmatrix} \Delta u_x & \Delta u_y & \Delta u_z \\ \Delta v_x & \Delta v_y & \Delta v_z \\ \Delta s_x & \Delta s_y & \Delta s_z \end{bmatrix}^{-1}$$

Once the Jacobian matrix is determined, it is possible to determine the amount of robot movement $(\Delta x, \Delta y, \Delta s)$ for bringing the robot 1 to the target arrival state by substituting the feature quantities (u, v, s) of an arbitrary object 4 into Eq. (1).

The process described above enables the robot 1 to perform operations on the object 4 placed at an arbitrary position on table 5 while correcting the robot program. However, the determined amount of robot movement $(\Delta x, \Delta y, \Delta z)$ has the possibility of a move that changes the distance between the camera 3 and the table 5, hence efficiency is poor despite the fact that this method can eventually reach the target arrive state.

For this reason, the next description will be made on the method, disclosed by the invention, of calculating the amount of robot movement that will not vary the distance between the robot 1 and the table 5, by calculating the normal to the table 5 surface on which the object 4 is placed, and moving the robot parallel to the table 5 surface and rotating the robot about an axis parallel to the normal to the table 5 surface.

First, it is assumed that the aforementioned Jacobian matrix has been already determined and the robot 1 is ready to start operations on the object 4 placed at an arbitrary position on the table 5 in accordance with the procedures from S201 to S207.

It is generally known that three non-identical points residing on a plane should be known in order to determine an arbitrary plane in three dimensions.

In considering the positional components (x, y, z) of the above-described second robot position stored at S206, (x, y, z) gives the position of the origin point of the mechanical interface coordinate system Σf viewed from the robot coordinate system Σb when the robot 1 is positioned at the second robot position.

The positional components (x, y, z) of the second robot position do not designate a point on the plane of table 5. However, if the positional components $(x_i, y_i, z_i)$ at a plurality of second robot positions have been known, these points must reside practically on one plane. Further the plane defined by the multiple coordinate points $(x_i, y_i, z_i)$ must be parallel to the plane of the table 5. Accordingly, it is possible to calculate the normal to the table 5's plane by calculating the normal to the plane formed by $(x_i, y_i, z_i)$.

Generally, an arbitrary plane in three dimensions can be represented by the following equation:—

$$ax+by+cz=d$$

Here, a vector n=(a, b, c) is a normal vector to the plane, and the scalar value d represents the length of the perpendicular line from the origin point of the coordinate system to the plane. From the above, when there are a plurality of second robot positions specified by $(x_i, y_i, z_i)$ that satisfies the following relation may and should be determined.

$$\begin{bmatrix} x_1 & y_1 & z_1 \\ x_2 & y_2 & z_2 \\ & \vdots & \\ x_n & y_n & z_n \end{bmatrix} \begin{bmatrix} a \\ b \\ c \end{bmatrix} = \begin{bmatrix} d \\ d \\ \vdots \\ d \end{bmatrix}$$

From this, the normal vector n is determined by the least square method.

When $$X = \begin{bmatrix} x_1 & y_1 & z_1 \\ x_2 & y_2 & z_2 \\ & \vdots & \\ x_n & y_n & z_n \end{bmatrix},$$

the following equation can be derived.

$$\begin{bmatrix} \frac{a}{d} \\ \frac{b}{d} \\ \frac{c}{d} \end{bmatrix} = (X^T \cdot X)^{-1} X^T \begin{bmatrix} 1 \\ 1 \\ \vdots \\ 1 \end{bmatrix}$$

By normalizing this vector (a/d, b/d, c/d), it is possible to calculate the normal vector to the plane created by a plurality of second robot positions, or the normal vector n to the table 5's plane.

The first robot position may be used to replace one of the second robot positions.

Since this embodiment takes on the form of calculating the normal vector n in the process of causing the robot 1 to perform the predetermined operation, step. S207 is implemented at the same time. However, if it is desired to calculate only the normal vector a first without causing the robot 1 to work, step S207 is suspended until the normal vector a is calculated.

Finally described is the method for making the amount of robot movement calculated at step S203 to include only a translational motion parallel to the table 5's plane, based on the calculated normal vector n.

Herein, as a new coordinate system a tool coordinate system Σt is introduced. The tool coordinate system Σt is a coordinate system that is defined to be relatively fixed to the mechanical interface coordinate system Σf, hence moves while keeping the relative positional relationship with the mechanical interface coordinate system Σf when the robot 1 is moved.

Figure 7:
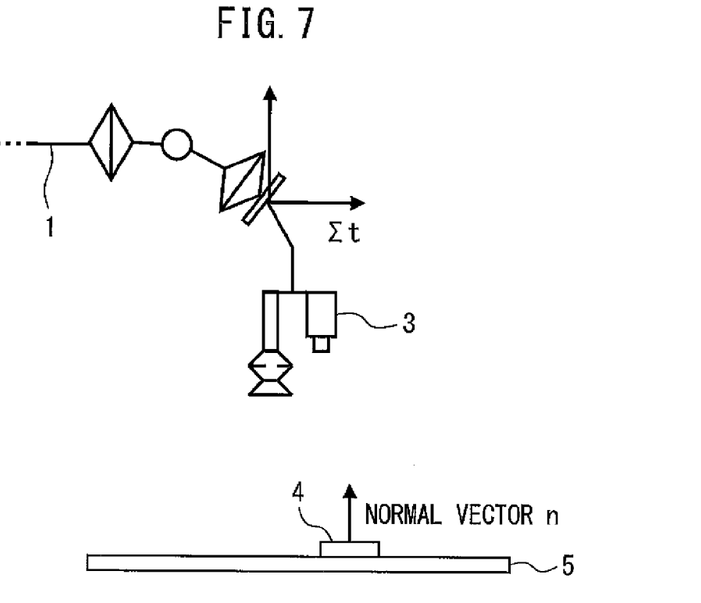
FIG. 7 is a diagram for illustrating the definition of a tool coordinate system.

As shown in FIG. 7, the tool coordinate system Σt can be defined, as one example, as a coordinate system that has the same origin point as that of the mechanical interface coordinate system Σf and has its Z axis parallel to the normal vector n to the table 5 surface when the robot 1 is positioned at the first robot position. The X and Y axes of the tool coordinate system Σt may be oriented in any direction as long as they are orthogonal to the Z axis and orthogonal to each other.

Defining the tool coordinate system Σt is equivalent to determining a position and attitude T of the tool coordinate system Σt viewed from the mechanical interface coordinate system Σf. T is a 4×4 homogeneous transformation matrix.

First, on the premise that the robot 1 is positioned at the first robot position, the position and attitude Tb of the tool coordinate system Σt viewed from the robot coordinate system Σb is determined in accordance with the following procedures.

When the directional vectors of the X-axis, Y-axis and Z-axis of the tool coordinate system Σt, viewed from the robot coordinate system Σb are denoted by $V_x$, $V_y$ and $V_z$, respectively, $V_z$ can be expressed by the following equation because the Z-axis is directed in the same direction as the normal vector n.

$$V_z = \vec{n}$$

Since the X-axis and the Y-axis can be oriented in any direction, the X-axis may be defined to direct from the first one of the second robot positions to the second one of the second robot positions while the Y-axis may be defined to be laid to be perpendicular to both the X-axis and the Z-axis. That is, $V_x$ and $V_y$ are given by the following expressions:—

$$V_X = \begin{bmatrix} x_2 - x_1 \\ y_2 - y_1 \\ z_2 - z_1 \end{bmatrix} \Big/ k$$

$$V_Y = V_Z \times V_X$$

where k is given by the following expression:—

$$k = \sqrt{(x_2-x_1)^2 + (y_2-y_1)^2 + (z_2-z_1)^2}$$

Since the origin point of the tool coordinate system Σt takes the same coordinate values as those of the origin point of Σf viewed from the robot coordinate system Σb when the robot 1 is positioned at the first robot position $R_1$, when the origin point is denoted by $(x_0, y_0, z_0)$, the position and attitude $T_b$ of the tool coordinate system Σt viewed from the robot coordinate system Σb is given by the following expression:—

$$T_b = \begin{bmatrix} & & & x_0 \\ V_X & V_Y & V_Z & y_0 \\ & & & z_0 \\ 0 & 0 & 0 & 1 \end{bmatrix}$$

Further, since the robot 1 is positioned at the first robot position $R_1$, the following equation holds.

$$T_b = R_1 \cdot T$$

Accordingly, the position and attitude T of the tool coordinate system Σt, viewed from the mechanical interface coordinate system Σf can be calculated by the following equation.

$$T = R_1^{-1} \cdot T_b$$

Since the position and attitude T of the tool coordinate system Σt, viewed from the mechanical interface coordinate system Σf has been determined, the amount of robot movement (Δx, Δy, Δz) represented in the mechanical interface coordinate system Σf can be transformed into the amount of robot movement (Δx', Δy', Δz') viewed from the tool coordinate system Σt, by use of the following equation.

$$\begin{bmatrix} \Delta x' \\ \Delta y' \\ \Delta z' \\ 1 \end{bmatrix} = T^{-1} \begin{bmatrix} \Delta x \\ \Delta y \\ \Delta z \\ 1 \end{bmatrix}$$

In the above equation, since T is a 4×4 homogeneous transformation matrix, the robot movement amount vector is also expanded into four dimensions. However, the rotational components of T may be defined as a 3×3 rotational matrix M, with which the equation can be expressed as the following equation.

$$\begin{bmatrix} \Delta x' \\ \Delta y' \\ \Delta z' \end{bmatrix} = M^{-1} \begin{bmatrix} \Delta x \\ \Delta y \\ \Delta z \end{bmatrix}$$

As to the thus determined, the amount of robot movement (Δx', Δy', Δz') in the tool coordinate system Σt representation, Δz' should be ideally zero from the fact that the Z-axis of the tool coordinate system Σt is perpendicular to the table 5 surface and that the object 4 is placed on the table 5. However, it will not be exactly zero due to various factors such as detection error, calculator error and others. As a result, if the robot is moved in accordance with the calculated amount of robot movement, the robot will approach the table 5 somewhat closely in some cases and somewhat distantly in other cases. In this case, if Δz' is substituted by 0 so that the amount of robot movement is (Δx', Δy', 0), it is possible to move the robot while keeping the exact distance from table 5.

The above equation (1) is given as follows:—

$$\begin{bmatrix} \Delta x \\ \Delta y \\ \Delta z \end{bmatrix} = J \begin{bmatrix} \Delta u \\ \Delta v \\ \Delta s \end{bmatrix}$$

Therefore, the following equation can be obtained.

$$\begin{bmatrix} \Delta x' \\ \Delta y' \\ \Delta z' \end{bmatrix} = M^{-1} \cdot J \begin{bmatrix} \Delta u \\ \Delta v \\ \Delta s \end{bmatrix}$$

Accordingly, J' can be calculated by the following equation.

$$J' = M^{-1} \cdot J$$

When J', which has been calculated in advance in accordance with the above equation, is used at step S203 instead of Jacobian matrix J, the amount of robot movement (Δx', Δy', Δz') represented in the tool coordinate system Σt can be directly calculated from (Δu, Δv, Δs).

As for Δθ, i.e., the apparent orientation change of the object 4 in the image, since the Z-axis of the tool coordinate system Σt is perpendicular to the table 5 surface, the robot 1 may be rotated by Δθ about the Z-axis of the tool coordinate system.

Figure 8:
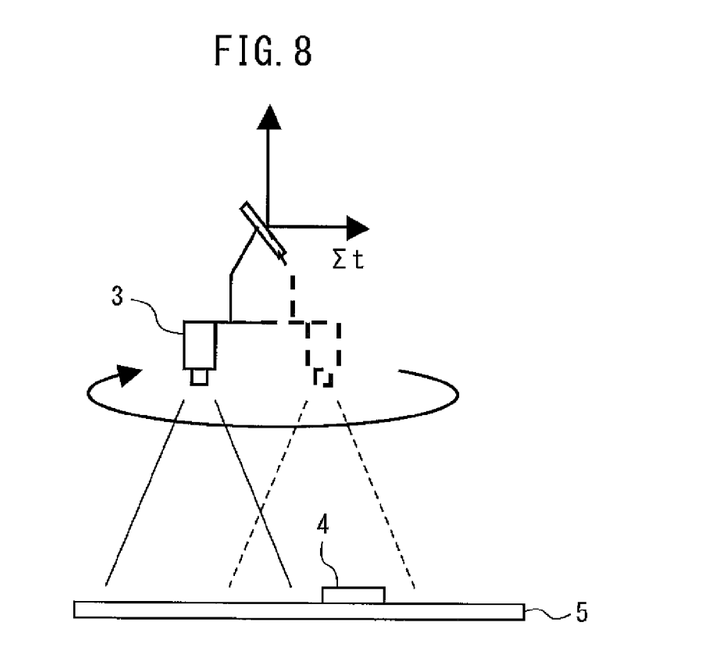
FIG. 8 is a diagram showing the positional relationship between a tool coordinate system and a camera.

In this case, however, as shown in FIG. 8 there is a possibility that the object 4 gets out of the visual field of the camera 3 by rotationally moving the robot 1 about the Z-axis of the tool coordinate system Σt, depending on the positional relationship between the tool coordinate system Σt and the camera 3.

Figure 9:
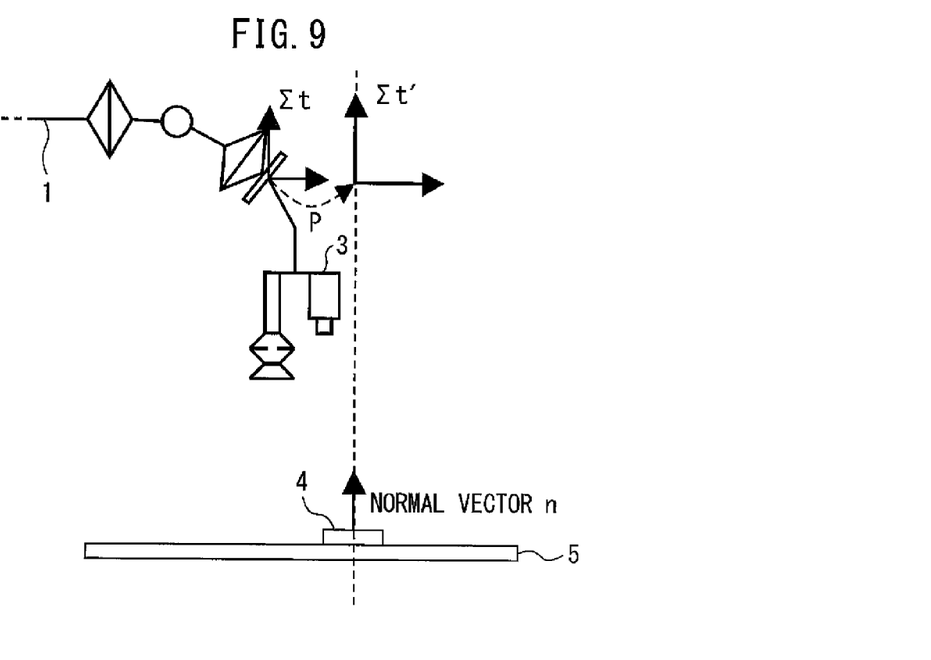
FIG. 9 is a diagram showing the positional relationship between a tool coordinate system and a second tool coordinate system; and, FIG. 10 is a diagram showing how a tool coordinate system is rotated about the Z-axis.

To deal with this, as shown in FIG. 9, by calculating a second tool coordinate system Σt' that is created by translating the origin point of the tool coordinate system Σt so as to have its origin point on the axis that cuts through the center of the object 4 and is aligned parallel to the normal vector n when the object 4 is placed at the first object position while the robot 1 is positioned at the first robot position, and making a rotation by Δθ about the Z-axis of the second tool coordinate system Σt', it is possible to solve the problem that the object 4 gets out of the visual field of the camera 3. Now, the calculation method of the second tool coordinate system Σt' will be described.

Since the tool coordinate system Σt and the second tool coordinate system Σt' are parallel to each other with only their origin points different from each other, let P be the vector reaching from the origin point of the tool coordinate system Σt to the origin point of the to coordinate system Σt', represented on the bass of the tool coordinate system Σt.

In the state where an object 4 is placed at an appropriate position on the table 5, for example at the first object position and the robot 1 is positioned at, for example the first robot position, the object 4 is detected from the image of the camera 3 by performing image processing. The position and attitude of the tool coordinate system Σt viewed from the robot coordinate system Σb is denoted as Tb, the coordinate values of the origin point of the tool coordinate system Σt viewed from the robot coordinate system Σb are denoted as $(x_1, y_1, z_1)$, and the coordinate values of the detected object 4 in the vision coordinate system are denoted as $(u_1, v_1)$.

Next, while the object 4 is maintained at the same position, the robot 1 is rotationally moved by a minute angle φ about the Z-axis of the tool coordinate system Σt, and visual feedback is applied using the aforementioned method so that the feature quantities of the object 4 appearing in the image of the camera 3 will coincide with the above-mentioned $(u_1, v_1)$. At the robot position of convergence, the coordinate values of the origin point of the tool coordinate system Σt viewed from the robot coordinate system Σb are denoted by $(x_2, y_2, z_2)$.

Figure 10:
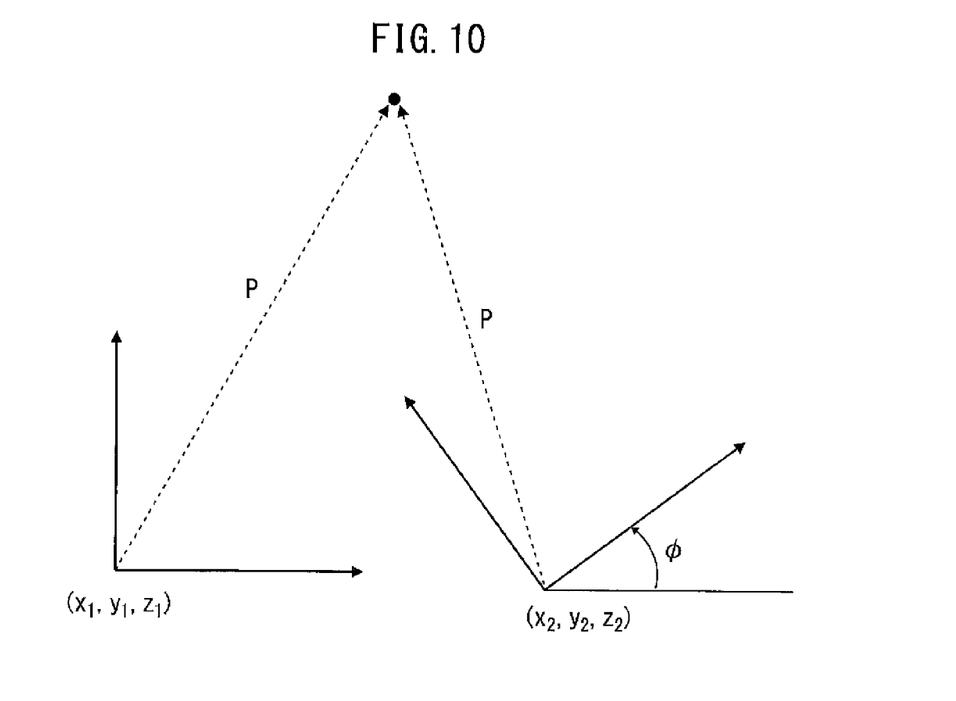

FIG. 10 is a diagram depicting this situation from the top. Since the object 4 appears at the same coordinate value $(u_1, v_1)$ on the image of the camera 3 at two robot positions different in angle to each other, the following equation holds:—

$$P = R(\phi) \cdot P + \Delta t \qquad (2)$$

where $$R(\phi) = \begin{bmatrix} \cos(\phi) & -\sin(\phi) & 0 \\ \sin(\phi) & \cos(\phi) & 0 \\ 0 & 0 & 1 \end{bmatrix}$$

-continued $$\begin{bmatrix} \Delta t_x \\ \Delta t_y \\ \Delta t_z \\ 1 \end{bmatrix} = T_b^{-1} \begin{bmatrix} x_2 - x_1 \\ y_2 - y_1 \\ z_2 - z_1 \\ 1 \end{bmatrix}$$

By expanding the equation (2), the following equation can be obtained:—

$$\begin{bmatrix} 1-\cos(\phi) & \sin(\phi) & 0 \\ -\sin(\phi) & 1-\cos(\phi) & 0 \\ 0 & 0 & 1 \end{bmatrix} P = \begin{bmatrix} \Delta t_x \\ \Delta t_y \\ \Delta t_z \end{bmatrix}$$

As the above equation is solved for P, the following solution can be obtained:—

$$P = \begin{bmatrix} 1-\cos(\phi) & \sin(\phi) & 0 \\ -\sin(\phi) & 1-\cos(\phi) & 0 \\ 0 & 0 & 1 \end{bmatrix}^{-1} \begin{bmatrix} \Delta t_x \\ \Delta t_y \\ \Delta t_z \end{bmatrix}$$

Since the transformation from the tool coordinate system $\Sigma t$ to the second tool coordinate system $\Sigma t'$ does not involve any rotational transformation, the origin point of the second tool coordinate system $\Sigma t'$ can be determined by moving the origin point of the tool coordinate system $\Sigma t$ by the vector P.

By the above process, the movement can be limited to only parallel motion within a plane perpendicular to the determined normal and rotational motion about an axis parallel to the determined normal. As a result, the direction of the translation and the rotational axis required for convergence can be limited, so that it is possible to reduce the time for convergence. Specifically, since there is no operation for convergence in the height direction when the object is moved to the target position on the image so that the size of the object on the image is unvaried, it is no longer necessary to perform calculations for size discrepancy and convergence decision in determining convergence. As a result the processing time and hence the convergence time can be shortened.

By controlling the robot so that the feature quantities of the object appearing on the image taken by the camera coincide with the target arrival state data, it is possible to expect that the relative positional relationship between the object placed at the second object position and the second robot position is equivalent to the relative positional relationship between the object placed at the first object position and the first robot position. Accordingly, it is possible to correct the program that has been taught to perform operations on the object placed at the first object position, based on the difference between the first robot position and the second robot position, and run the corrected program to thereby perform the operations on the object placed at the second object position. This means that the desired operations can be done for the object placed at the second object position even if the operations of the robot taught in the program include complicated paths.

The robot system according to another embodiment of the present invention is characterized in that when the difference between at least, one feature quantity among the position, attitude and size of the object placed at the second object position, on the image captured by the camera with the arm end of the robot positioned at the second robot position, and the corresponding feature quantity of the target arrival state data stored in the target arrival state data storing unit, is greater than a predetermined value, the robot movement amount calculator calculates the amount of movement by regarding the second robot position as a revised initial position, and the position of the arm end after the arm end has been moved based on the calculated amount of movement is set as a revised second robot position.

A number of methods have been proposed as the method of determining the amount of robot movement that makes the robot coincide with the target arrival state. The present invention does not limit the way to determine the amount of robot movement. However, if a simple method is used, there are cases in which a single move of the robot based on the amount of movement determined for the first time cannot bring the robot into the target arrival state. In such a case, it is possible to repeat the same procedures by using the second robot position as a revised initial position so as to make the robot gradually approach the target arrival state.

The robot system according to a further embodiment of the present invention is characterized in that with the arm end of the robot positioned at the second robot position, the robot movement amount calculator calculates the amount of movement by regarding the second robot position as a revised initial position, and when the calculated amount of movement is greater than a predetermined value, the position of the arm end after the arm end has been moved based on the calculated amount of movement is set as a revised second robot position.

The robot system according to a still further embodiment of the present invention further includes: under the condition that a plurality of, at least, three, second object positions different from each other are provided, a second robot position storing unit that stores a plurality of second robot positions, each or which is obtained correspondingly by placing the object at one of the second object positions; and, a normal vector calculator that calculates a normal vector to the plane on which the object is placed, based on the second robot positions stored in the second robot position storing unit, and is characterized in that the robot movement amount calculator calculates only the translational motion within a plane perpendicular to the normal vector and the rotational motion about the axis parallel to the normal vector, as the amount of movement.

The robot system according to a still further embodiment of the present invention is characterized in that one of the second object positions different from each other is identical with the first object position, and one of the second robot positions is the first robot position.

The directional vector (normal vector) of an axis perpendicular to the table surface on which the object is placed can be calculated if the first robot position and two second robot positions, or three second robot positions are known. For example, the normal vector can be determined by calculating the cross product of the vector from the first robot position to the first one of the second robot positions and the vector from the first robot position to the second one of the second robot positions. Alternatively, when three or more second robot positions have been obtained, the normal vector can be calculated by using the least square method or the like.

In this case, since a plane cannot be determined if all the second robot positions to be used for calculation reside on a straight line, the placement of second object positions may and should be arranged in such a way that the first robot position and two second robot positions, or three second robot positions form a regular triangle, for example. There is also a risk that the normal vector to the plane cannot be determined correctly when three second robot positions are located in close proximity. Therefore, the second robot position to be stored in the second robot position storage is preferably stored after it has been checked that the second robot position in question is located more than a certain distance apart from the already stored second robot positions.

The robot movement amount calculator may define a straight line that cuts through the center of the object placed at the first object position and is parallel to the normal vector, as a relative straight line for the robot arm end when the robot is positioned at the first robot position, and the rotational motion based on the robot movement amount calculator may be carried out using the defined relative straight line to the arm end as the rotational axis.

The rotational axis for moving the robot so that the feature quantities of the object appearing on the camera image will become equivalent to the target arrival state data, is determined as an axis that is parallel to the normal vector cutting through the center of the object and is defined as a relative straight line to the robot arm end when the object is placed at the first object position and the robot is positioned at the first robot position. This configuration eliminates the risk of the object getting out of the image when the robot is rotationally moved.

As has been described heretofore, according to the robot system of the embodiment of the present invention, in the robot system for controlling a robot to perform predetermined operations by recognizing the position and attitude of the object to be handled, with a camera, it is possible to eliminate the constraint that visual feedback cannot be applied to a system that performs operations with complicated paths, while keeping the advantage of visual feedback which is that camera calibration is not needed.

Further, it is possible to eliminate the problem that the robot is apt to approach the table surface on which the object to be handled is pieced, sometimes closer, or sometimes distantly, or become inclined, to the table surface and cannot efficiently reach the target arrival state, so that it is possible to realize the target arrival state steadily and reliably in a short time.

What is claimed is:

1. A robot system, comprising:
   a robot that is controlled by a program including operational instructions for performing predetermined operations on an object placed at a first object position on a plane by use of a device attached to an arm end of the robot;
   a camera that is attached to the arm end to take an image of the object;
   a first robot position storing unit configured to store, as a first robot position, a position of the arm end arranged in a predetermined positional relationship relative to the first object position;
   a target arrival state data storing unit configured to store, at least one feature quantity among a position, attitude and size of the object on the image of the camera in a target arrival state where the object is placed at the first object position while the arm end is positioned at the first robot position, as the target arrival state data;
   a robot movement amount calculator configured to calculate an amount of movement from an arbitrary initial position of the arm end in order to make, at least one feature quantity of the position, attitude and size on the image of the object when the object placed at a second object position on the plane has been captured by the camera with the arm end of the robot positioned at the arbitrary initial position, agree with the at least one feature quantity of the target arrival state data; and
   a correction data calculator configured to calculate correction data for correcting a robot position taught in the program based on a difference between the first robot position and a second robot position, wherein the second robot position is the position of the arm end when the arm end has been moved based on the calculated amount of movement.

2. The robot system according to claim 1, wherein when a difference between at least one feature quantity among the position, attitude and size of the object placed at the second object position, on the image taken by the camera with the arm end of the robot positioned at the second robot position, and the at least one feature quantity of the target arrival state data stored in the target arrival state data storing unit, is greater than a predetermined value, the robot movement amount calculator calculates the amount of movement by regarding the second robot position as a revised initial position, and the position of the arm end after the arm end has been moved based on the calculated amount of movement is set as a revised second robot position.

3. The robot system according to claim 1, wherein with the arm end of the robot positioned at the second robot position, the robot movement amount calculator calculates the amount of movement by regarding the second robot position as a revised initial position, and when the calculated amount of movement is greater than a predetermined value, the position of the arm end after the arm end has been moved based on the calculated amount of movement is set as a revised second robot position.

4. The robot system according to claim 1, further comprising:
   when at least three second object positions different from each other and not located on a straight line are provided,
      a second robot position storing unit configured to store a plurality of second robot positions, each of which is obtained correspondingly by placing the object at one of the second object positions; and
      a normal vector calculator configured to calculate a normal vector to the plane on which the object is placed, based on the second robot positions stored in the second robot position storing unit,
      wherein the robot movement amount calculator calculates only a translational motion within a plane perpendicular to the normal vector and a rotational motion about a rotational axis parallel to the normal vector, as the amount of movement.

5. The robot system according to claim 4, wherein one of the second object positions different from each other is identical with the first object position, and one of the second robot positions is the first robot position.

6. The robot system according to claim 4, wherein
   the robot movement amount calculator defines a straight line that cuts through a center of the object placed at the first object position and is parallel to the normal vector, as a relative straight line for the arm end when the arm end is positioned at the first robot position, and the rotational motion is done using the defined relative straight line for the arm end as the rotational axis, and
   the center of the object is obtained as a center position of a template that shows a highest degree of match by adopting template matching as an image processing algorithm.

* * * * *